US012345308B2

(12) United States Patent
Haudrich et al.

(10) Patent No.: US 12,345,308 B2
(45) Date of Patent: Jul. 1, 2025

(54) METHODS, SYSTEMS, APPARATUS, AND ARTICLES OF MANUFACTURE TO DAMP CATAPULT LOADS ON AN AIRCRAFT

(71) Applicant: The Boeing Company, Arlington, VA (US)

(72) Inventors: Darin P. Haudrich, Des Peres, MO (US); Zachary S. Lively, Saint Peters, MO (US)

(73) Assignee: The Boeing Company, Arlington, VA (US)

( * ) Notice: Subject to any disclaimer, the term of this patent is extended or adjusted under 35 U.S.C. 154(b) by 240 days.

(21) Appl. No.: 18/153,252

(22) Filed: Jan. 11, 2023

(65) Prior Publication Data

US 2024/0229893 A1    Jul. 11, 2024

(51) Int. Cl.
*B64F 1/06*          (2006.01)
*F16F 15/02*         (2006.01)

(52) U.S. Cl.
CPC .............. *F16F 15/022* (2013.01); *B64F 1/06* (2013.01); *F16F 2226/04* (2013.01)

(58) Field of Classification Search
CPC ....................................................... B64F 1/06
See application file for complete search history.

(56) References Cited

U.S. PATENT DOCUMENTS

| 2,942,805 | A | * | 6/1960 | Zimnoch | B64F 1/06 244/50 |
| 3,155,345 | A | * | 11/1964 | Paysen | B64F 1/06 244/63 |
| 3,370,811 | A | * | 2/1968 | Boody | B64F 1/06 244/50 |
| 3,647,164 | A | * | 3/1972 | Smith | B64F 1/06 244/63 |
| 5,732,906 | A | * | 3/1998 | Wong | B64C 25/50 244/63 |
| 5,961,069 | A | * | 10/1999 | Perrier | B64F 1/06 244/63 |

\* cited by examiner

*Primary Examiner* — Justin M Benedik
(74) *Attorney, Agent, or Firm* — Hanley, Flight & Zimmerman, LLC (57) ABSTRACT

Methods, systems, apparatus, and articles of manufacture to damp catapult loads on an aircraft are disclosed. An example apparatus disclosed herein includes a launch bar including a first portion and a second portion, the first portion to be releasably coupled to an aircraft catapult, the second portion to be releasably coupled to an aircraft catapult system, and a damper operatively coupled between the first and second portions, the damper to reduce longitudinal forces applied to the launch bar at the first and second portions when the aircraft is launched by the aircraft catapult.

11 Claims, 10 Drawing Sheets

METHODS, SYSTEMS, APPARATUS, AND ARTICLES OF MANUFACTURE TO DAMP CATAPULT LOADS ON AN AIRCRAFT

FIELD OF THE DISCLOSURE

This disclosure relates generally to aircraft and, more particularly, to methods, systems, apparatus, and articles of manufacture to damp catapult loads on an aircraft.

BACKGROUND

Some aircraft rely on relatively short areas and/or distances for takeoff and/or landing. In particular, aircraft carriers typically employ catapult systems (e.g., launch systems, aircraft catapult systems) to launch an aircraft in a limited area. Accordingly, some catapult systems include a shuttle that is couplable to a launch bar (e.g., a towbar) of the aircraft and also movable relative to a flight deck of the aircraft carrier. Pressure and/or electromagnetic forces accelerate the shuttle and, thus, the aircraft to provide sufficient acceleration for takeoff.

SUMMARY

A first example apparatus disclosed herein includes a launch bar including a first portion and a second portion, the first portion to be releasably coupled to an aircraft catapult, the second portion to be coupled to an aircraft, and a damper operatively coupled between the first and second portions, the damper to reduce forces applied to the launch bar at the first and second portions when the aircraft is launched by the aircraft catapult.

A second example apparatus disclosed herein includes a towbar to be operatively coupled between a landing gear strut of an aircraft and a shuttle of an aircraft catapult system, a drag brace coupled to the landing gear strut, the drag brace at an angular offset from the landing gear strut, and a shock absorber positioned in at least one of the towbar or the drag brace, the shock absorber to dampen a longitudinal load applied to the towbar.

An example method disclosed herein includes operatively coupling a first portion of a launch bar to a landing gear strut of an aircraft, the launch bar including a damper positioned between the first portion and a second portion of the launch bar, operatively coupling the second portion of the launch bar to an aircraft catapult, and launching the aircraft, the damper to reduce longitudinal forces applied to the launch bar during launch of the aircraft.

BRIEF DESCRIPTION OF THE DRAWINGS

In general, the same reference numbers will be used throughout the drawing(s) and accompanying written description to refer to the same or like parts. The figures are not to scale.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time +/—1 second.

DETAILED DESCRIPTION

In some environments (such as an aircraft carrier), only a relatively small distance and/or area is available for takeoff and/or landing of an aircraft (e.g., a manned or unmanned aircraft, a fixed wing aircraft, an unmanned aerial vehicle (UAV), etc.). Thus, a catapult system (e.g., an aircraft catapult system, an aircraft launch system) is typically implemented to provide sufficient acceleration to the aircraft to enable takeoff of the aircraft. In many aircraft carriers, the catapult system includes a shuttle to slide and/or translate relative to a flight deck of the aircraft carrier. Prior to launch of the aircraft, a launch bar of the aircraft is coupled to the shuttle, and a holdback bar of the aircraft is coupled to the flight deck to hold the aircraft in position. When a threshold force (e.g., fluid pressure, electromagnetic force) is applied to the shuttle, the holdback bar releases the aircraft from the flight deck and the applied force propels (e.g., accelerates) the shuttle and, thus, the aircraft forward along the flight deck. Acceleration of the aircraft by the shuttle generates thrust and/or lift on the aircraft, and the launch bar releases from the shuttle at an end of the catapult system to enable takeoff of the aircraft.

In some cases, during release of the holdback bar and/or the launch bar, loads (e.g., shock loads, vibratory loads) are imparted by the launch bar to the aircraft. In particular, the loads can travel through the launch bar and/or transfer to one or more aircraft components (e.g., landing gear, an airframe, and/or an engine) of the aircraft and may result in premature wear and/or reduced life of the aircraft components. In turn, repair and/or replacement can be necessitated and, thus, can increase maintenance cost associated with the aircraft. To mitigate the effects of the loads, the aircraft components can be designed and/or selected to increase strength and/or durability thereof. However, such measures may increase weight and/or cost associated with the aircraft and can even reduce energy efficiency (e.g., fuel efficiency) of the aircraft.

Examples disclosed herein reduce forces imparted to an aircraft by damping loads acting on the aircraft during launch (e.g., by an example catapult system). An example launch bar (e.g., a towbar) disclosed herein implements an example damper (e.g., a shock absorber) to damp and/or oppose loads (e.g., longitudinal loads) generated in the launch bar during launch of the aircraft. In some examples, the damper is a linear damper (e.g., a dashpot) including a piston movable within a cylinder. In some examples, the damper is oriented along (e.g., within ±2 degrees) a longitudinal axis of the launch bar. In some examples, the launch bar includes a linkage mechanism (e.g., a scissor mechanism) in which the damper can be disposed and oriented substantially perpendicular to the longitudinal axis of the launch bar. In such examples, the damper opposes angular displacement between links of the linkage mechanism. In some examples, the damper can include torsion springs implemented at one or more joints between respective ones of the links. In some examples, the damper and/or the linkage mechanism may be implemented in a drag brace of the aircraft (e.g., in addition to or instead of the launch bar).

Advantageously, by damping and/or reducing loads applied to a launch bar, examples disclosed herein reduce fatigue and/or wear to one or more aircraft components (e.g., landing gear, an airframe, and/or an engine) of an aircraft. Accordingly, examples disclosed herein reduce a need for repair and/or replacement of the aircraft components, thereby reducing parts and/or maintenance costs associated with the aircraft. Further, examples disclosed herein can reduce strength and/or durability requirements of the aircraft components and, as a result, examples disclosed herein can enable utilization of lightweight and/or relatively inexpensive materials (in comparison to typical known aircraft).

Figure 1:
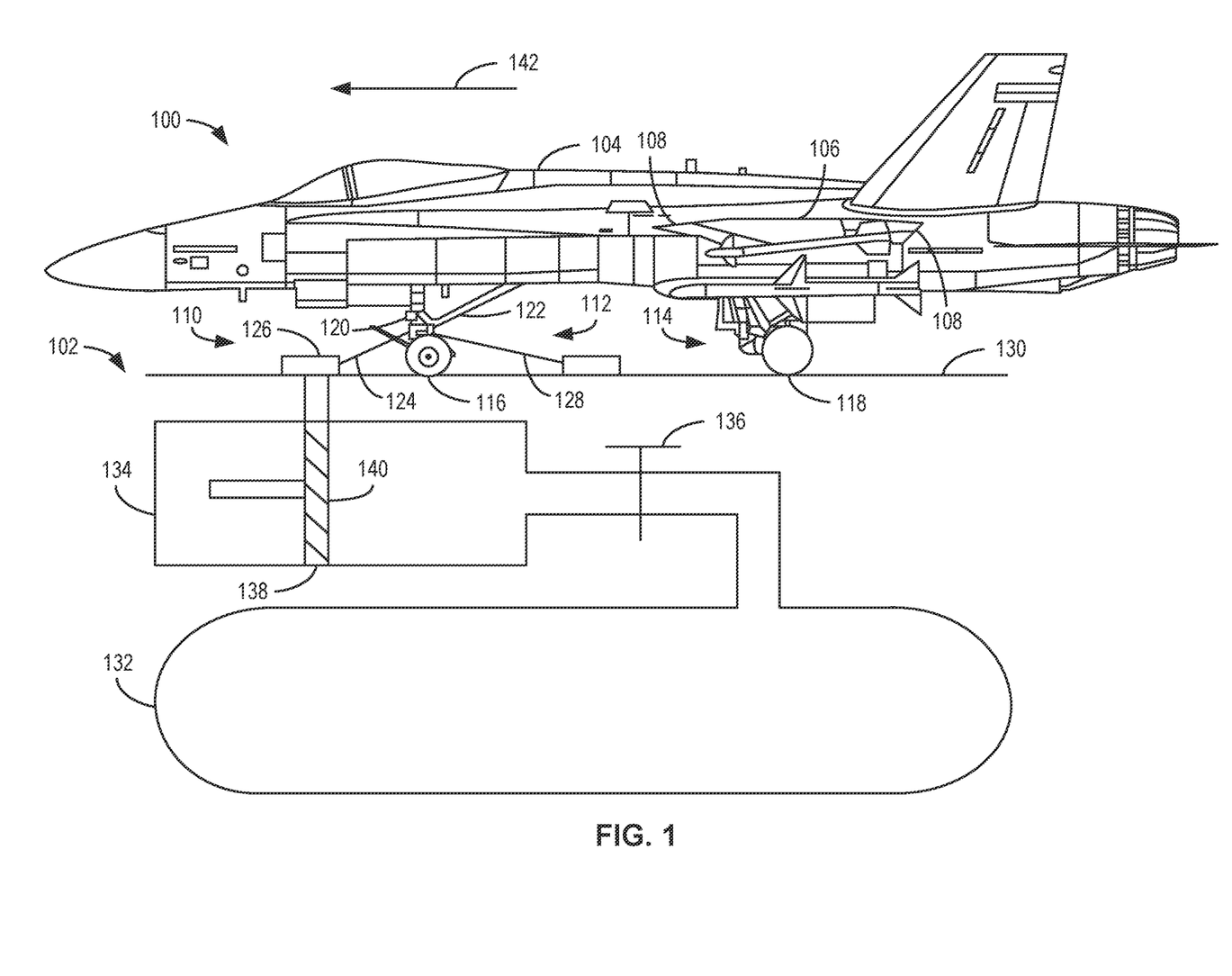
FIG. 1 illustrates an example aircraft catapult system in which examples disclosed herein may be implemented.

FIG. 1 illustrates an example catapult system (e.g., a launch system, an aircraft catapult system) 102 in which examples disclosed herein may be implemented. In the illustrated example of FIG. 1, an aircraft 100 includes a fuselage 104 and example wings (e.g., wing bodies, aerodynamic bodies) 106 coupled to the fuselage 104. In this example, the aircraft 100 is a fixed-wing aircraft. However, the aircraft 100 of FIG. 1 may be manned or unmanned, and can be implemented as a different type and/or classification of aircraft. Further, the wings 106 of the aircraft 100 have example control surfaces 108 located along the leading and/or trailing edges of the wings 106. The control surfaces 108 may be displaced or adjusted (e.g., angled, etc.) to provide lift during takeoff, landing, and/or flight maneuvers. In some examples, the control surfaces 108 can include leading edge flaps, leading edge slats, spoilers, trailing edge flaps, ailerons, flaperons, etc.

In the illustrated example of FIG. 1, the aircraft 100 includes example landing gear 110, where the landing gear 110 includes example nose gear (e.g., nose landing gear, front landing gear) 112 and example main gear (e.g., main landing gear, rear landing gear) 114. In some examples, the landing gear 110 is deployed during takeoff, landing, and/or taxi of the aircraft 100, and the landing gear 110 can be stowed (e.g., in the fuselage 104) during flight (e.g., cruise) to reduce drag on the aircraft 100. While the landing gear 110 includes example wheels 116, 118 in this example, the landing gear 110 does not include the wheels 116, 118 in some other examples. Particularly, the landing gear 110 can include skis and/or floats in addition to or instead of the wheels 116, 118.

In the illustrated example, the nose gear 112 includes an example landing gear strut 120 coupled to the wheel 116, and an example drag brace 122 coupled between the landing gear strut 120 and the fuselage 104. In some examples, the drag brace 122 is at an angular offset from the landing gear strut 120. In this example, a launch bar (e.g., a towbar) 124 is coupled to the landing gear strut 120 and releasably coupled to an example shuttle 126 of the catapult system 102. Further, an example holdback bar 128 is coupled to the landing gear strut 120 and to an example flight deck 130. In some examples, the shuttle 126 is movable (e.g., slidable) relative to and/or along the flight deck 130.

In the illustrated example of FIG. 1, the flight deck 130 provides a relatively small distance and/or area for takeoff of the aircraft 100. As such, the catapult system 102 can be used to propel and/or accelerate the aircraft 100 along a length of the flight deck 130 to generate acceleration necessary for takeoff of the aircraft 100. In this example, the catapult system 102 includes an example accumulator 132 fluidly coupled to an example cylinder 134, and an example valve 136 fluidly and/or operatively coupled between the accumulator 132 and the cylinder 134. Further, an example piston 138 is disposed in and/or movable within the cylinder 134. the example shuttle 126 is operatively coupled to and/or movable with the piston 138.

In some examples, prior to launch of the aircraft 100, the launch bar 124 is releasably coupled to the shuttle 126, and the holdback bar 128 is releasably coupled to the flight deck 130. The piston 138 is held in a locked position, and the valve 136 is opened to allow pressurized fluid (e.g., water, steam, hydraulic fluid) to flow from the accumulator 132 and into the cylinder 134. In some examples, the fluid is provided to the cylinder 134 until a build-up of pressure acting on an example surface 140 of the piston 138 satisfies a threshold pressure (e.g., is at or above the threshold pressure). In some examples, when the pressure acting on the surface 140 satisfies the threshold pressure, one or more engines of the aircraft 100 are turned on to generate thrust while the holdback bar 128 holds the aircraft 100 in position. To launch the aircraft 100, the piston 138 is released from the locked position, and the resultant pressure acting on the surface 140 of the piston 138 causes the piston 138 and, thus, the shuttle 126 to accelerate in an example forward direction 142 of the aircraft 100. In such examples, sudden acceleration of the piston 138 and/or the shuttle 126 causes the holdback bar 128 to break and/or release from the flight deck 130 and/or the aircraft 100, thus allowing the aircraft 100 to accelerate with the shuttle 126. As the shuttle 126 and the aircraft 100 are propelled forward along the flight deck 130, lift is generated on the wings 106 of the aircraft 100. When the aircraft 100 reaches an end of the flight deck 130, the launch bar 124 is released from the shuttle 126 to enable the aircraft 100 to take off and/or ascend from the flight deck 130.

In some examples, loads (e.g., shock loads, vibratory loads) act on the landing gear 110 during launch of the aircraft 100 by the catapult system 102. For example, the loads are applied to the launch bar 124 and transferred to one or more components (e.g., the landing gear strut 120, the drag brace 122, the wheel 116, etc.) of the aircraft 100. In particular, the loads increase during release of the holdback bar 128 from the flight deck 130 and/or during release of the launch bar 124 from the shuttle 126. In some examples, the loads on the one or more components of the aircraft 100 may result in premature wear on the one or more components.

Figure 2:
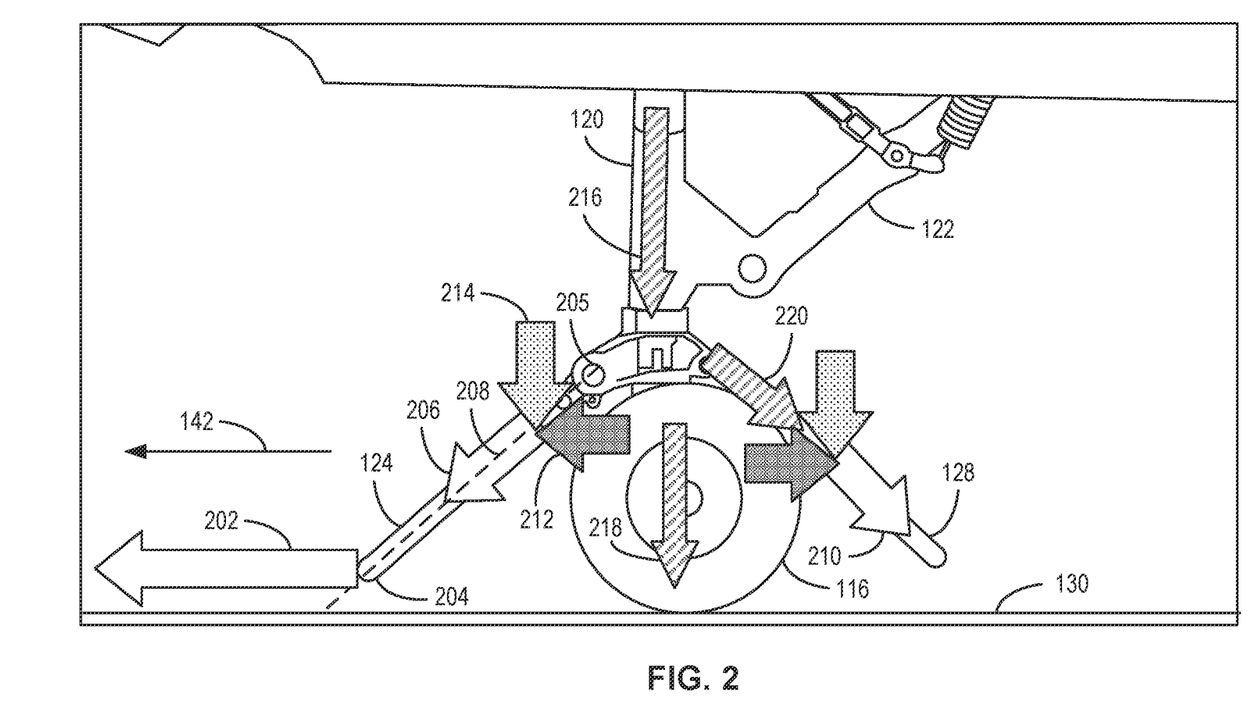
FIG. 2 illustrates an example load distribution on example landing gear of the example aircraft of FIG. 1.

FIG. 2 illustrates an example load distribution corresponding to the example nose gear 112 of the aircraft 100 of FIG. 1. In some examples, the load distribution shown in FIG. 2 occurs after release of the piston 138 of the catapult system 102 of FIG. 1 but prior to release of the holdback bar 128 from the flight deck 130. In the illustrated example of FIG. 2, when release of the piston 138 propels the example shuttle 126 of FIG. 1 in the example forward direction 142, the shuttle 126 pulls on the launch bar 124 and generates a tensile load (e.g., a tensile force) 202 on the launch bar 124 in the forward direction 142, where the tensile load 202 acts at a first example end (e.g., a first portion, a first end portion) 204 opposite a second example end (e.g., a second portion, a second end portion) 205 of the launch bar 124. Further, the tensile load 202 is transferred between the first and second ends 204, 205 of the launch bar 124 as a second example load (e.g., a longitudinal load, a second force) 206 acting along an example longitudinal axis 208 of the launch bar 124. In this example, a third example load (e.g., a third force) 210 is also generated in the holdback bar 128 while the holdback bar 128 holds the aircraft 100 in position.

In the illustrated example of FIG. 2, an example horizontal component 212 of the second load 206 pulls the launch bar 124 and, thus, the aircraft 100 in the forward direction 142. Further, an example vertical component 214 of the second load 206 generates fourth and fifth loads 216, 218 in the landing gear strut 120 and the wheel 116, respectively. For example, the vertical component 214 of the second load 206 pulls downward on the landing gear strut 120 to cause compression of a damper (e.g., an oleo damper, a spring damper, etc.) implemented in the landing gear strut 120. The compression of the damper results in the fourth load 216, and a first portion of the fourth load 216 produces the fifth load 218 at the wheel 116 to cause compression thereof. In some examples, a second portion of the fourth load 216 produces a sixth load 220, which compresses the holdback bar 128. In some examples, the compression of the holdback bar 128 counteracts and/or relieves tension in the holdback bar 128 caused by the third load 210.

In some examples, subsequent to release of the holdback bar 128 from the flight deck 130 and/or the landing gear strut 120, transient loads (e.g., shock loads, vibratory loads) are generated in the landing gear strut 120 and/or the drag brace 122. Such transient loads may also occur after release of the launch bar 124 from the shuttle 126. In some examples, the transient loads are present for a duration (e.g., less than 1 second, less than 0.3 seconds, etc.) after release of the holdback bar 128 and/or the launch bar 124. In some examples, the transient loads may reduce a clearance and/or cause a contact between parts of the aircraft 100, resulting in damage thereto.

Figure 3A:
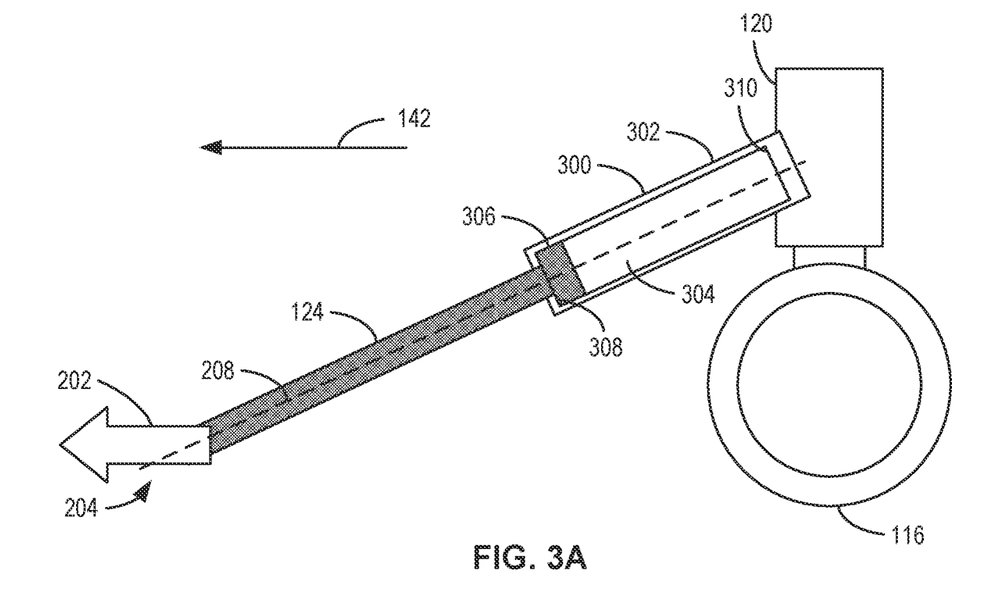
FIG. 3A illustrates an example launch bar in accordance with teachings of this disclosure.

FIG. 3A illustrates the example launch bar 124 of FIGS. 1 and/or 2 in accordance with teachings of this disclosure. In the illustrated example of FIG. 3A, an example damper (e.g., a shock absorber) 300 is coupled between the first and second ends 204, 205 of the launch bar 124, where the first end 204 is to be coupled to the shuttle 126 of FIG. 1 and the second end 205 is coupled to the landing gear strut 120. In the illustrated example, the damper 300 is a linear damper (e.g., a dashpot). For example, the damper 300 includes an example cylinder 302 having example fluid (e.g., gas and/or liquid) 304 contained therein, and an example piston 306 movable within the example cylinder 302 between a first example inner surface 308 and a second example inner surface 310 of the cylinder 302. In this example, the damper 300 is substantially aligned with (e.g., parallel to within ±2 degrees) the example longitudinal axis 208 of the launch bar 124. In some examples, the damper 300 is oriented at an angular offset from the longitudinal axis 208.

In the illustrated example of FIG. 3A, the damper 300 is in an extended position (e.g., a fully extended position) in which the piston 306 is proximate (e.g., adjacent, in contact with) the first inner surface 308 of the cylinder 302. In some examples, the damper 300 is in the fully extended position of FIG. 3A when the catapult system 102 of FIG. 1 launches and/or propels the shuttle 126 in the forward direction 142. In such examples, the shuttle 126 generates the tensile load 202 on the launch bar 124 to cause the piston 306 to move to the fully extended position.

Figure 3B:
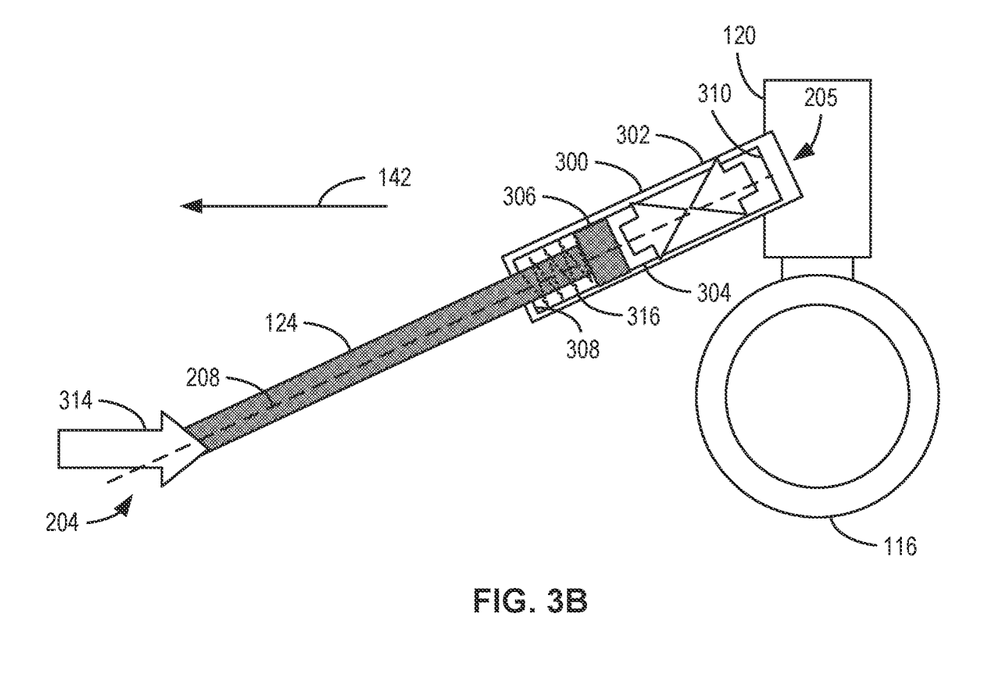
FIG. 3B illustrates the example of FIG. 3A, where a shock load is applied thereto.

FIG. 3B illustrates the example damper 300 of FIG. 3A, where an example shock load (e.g., a transitory load) 314 is applied to the launch bar 124. In some examples, the shock load 314 is a compressive load generated subsequent to release of the holdback bar 128 from the flight deck 130 of FIG. 1 and/or as a result of releasing the launch bar 124 from the shuttle 126 of FIG. 1. In some examples, the shock load 314 is substantially opposite to the forward direction 142, and at least a portion of the shock load 314 acts along the longitudinal axis 208 of the launch bar 124 from the first end 204 to the second end 205. In some examples, the shock load 314 causes the damper 300 to retract, such that the piston 306 moves within the cylinder 302 toward the second inner surface 310. As the damper 300 retracts, the piston 306 compresses the fluid 304 in the cylinder 302 between the piston 306 and the second inner surface 310. In some examples, compression of the fluid 304 in the cylinder 302 absorbs and/or damps a portion (e.g., all) of the shock load 314, such that a reduced load (e.g., a load less than the shock load 314) is applied to the landing gear strut 120 and/or the wheel 116. In some examples, the piston 306 can include one or more apertures to allow the fluid 304 to pass therethrough.

While the damper 300 includes the fluid 304 in this example, the damper 300 can, additionally or alternatively, implement one or more springs to damp the shock load 314. For example, one or more example springs 316 can be operatively coupled between the piston 306 and the first inner surface 308. Additionally or alternatively, the one or more springs 316 can be operatively coupled between the second inner surface 310 and the piston 306. In some examples, the one or more springs 316 oppose, damp, and/or absorb the shock load 314. For example, the one or more springs 316 urge the piston 306 to a resting position (e.g., a starting position) within the cylinder 302, where the resting position is between the extended position (e.g., in which the piston 306 is adjacent the first inner surface 308) and a retracted position (e.g., in which the piston 306 is adjacent the second inner surface 310). In some examples, the one or more springs 316 enable the piston 306 to return to the resting position when the shock load 314 is removed.

Figure 4:
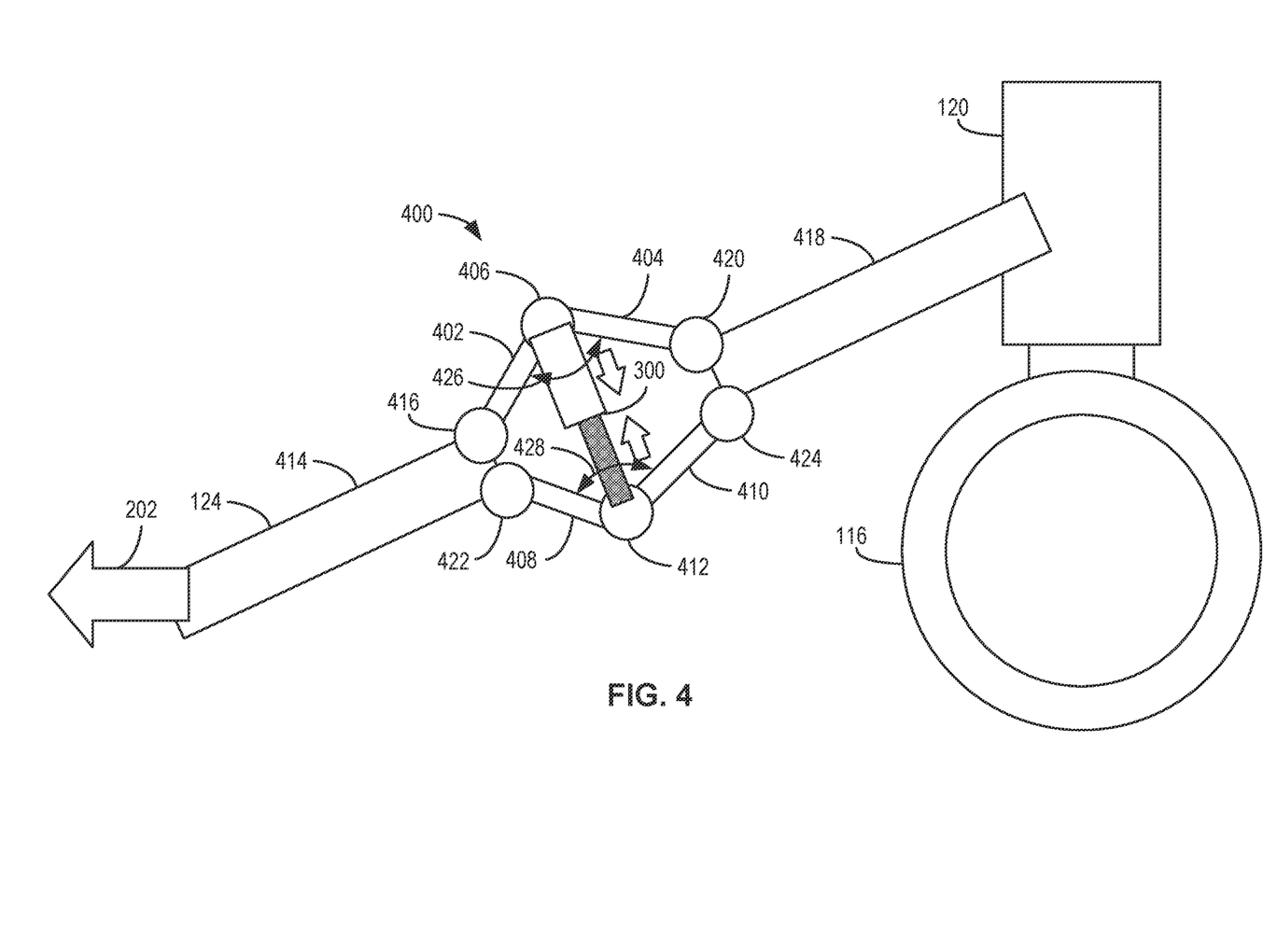
FIG. 4 illustrates an example linkage mechanism in which the example damper of FIGS. 3A and/or 3B may be implemented.

FIG. 4 illustrates an example linkage mechanism (e.g., a scissor mechanism, a linkage system) 400 in which the example damper 300 of FIGS. 3A and/or 3B may be implemented. In the illustrated example of FIG. 4, the linkage mechanism 400 includes a first example link 402 rotatably coupled to a second example link 404 at a first example joint (e.g., a first pin joint) 406, and a third example link 408 rotatably coupled to a fourth example link 410 at a second example joint (e.g., a second pin joint) 412. In this example, the first link 402 is rotatably coupled to a first example portion 414 of the launch bar 124 at a third example joint (e.g., a third pin joint) 416, and the second link 404 is rotatably coupled to a second example portion 418 of the launch bar 124 at a fourth example joint (e.g., a fourth pin joint) 420. Further, the third link 408 is rotatably coupled to the first portion 414 of the launch bar 124 at a fifth example joint (e.g., a fifth pin joint) 422, and the fourth link 410 is rotatably coupled to the second portion 418 of the launch bar 124 at a sixth example joint (e.g., a sixth pin joint) 424.

In the illustrated example of FIG. 4, when the tensile load 202 is applied to the launch bar 124, the tensile load 202 generates a first angular displacement between the first and second links 402, 404 about the first joint 406, and generates a second angular displacement between the third and fourth link 408, 410 about the second joint 412. In particular, when the tensile load 202 is applied to the launch bar 124, the first portion 414 of the launch bar pulls on the first and third links 402, 408, thereby causing the first link 402 to rotate clockwise in the view of FIG. 4 about the first joint 406 and the third link 408 to rotate counterclockwise in the view of FIG. 4 about the second joint 412. As a result, a first example angle 426 between the first and second links 402, 404 increases and, similarly, a second example angle 428 between the third and fourth links 408, 410 increases.

In the illustrated example of FIG. 4, the example damper 300 of FIG. 3 is operatively coupled between the first and second joints 406, 412. In this example, when the first and second angles 426, 428 increase as a result of the tensile load 202, the damper 300 is compressed (e.g., the damper 300 moves toward the retracted position of FIG. 3B). In such examples, a portion of the tensile load 202 is damped and/or dissipated by the damper 300 when the damper 300 is compressed, thereby reducing loads applied to the landing gear strut 120 and/or the wheel 116.

Figure 5:
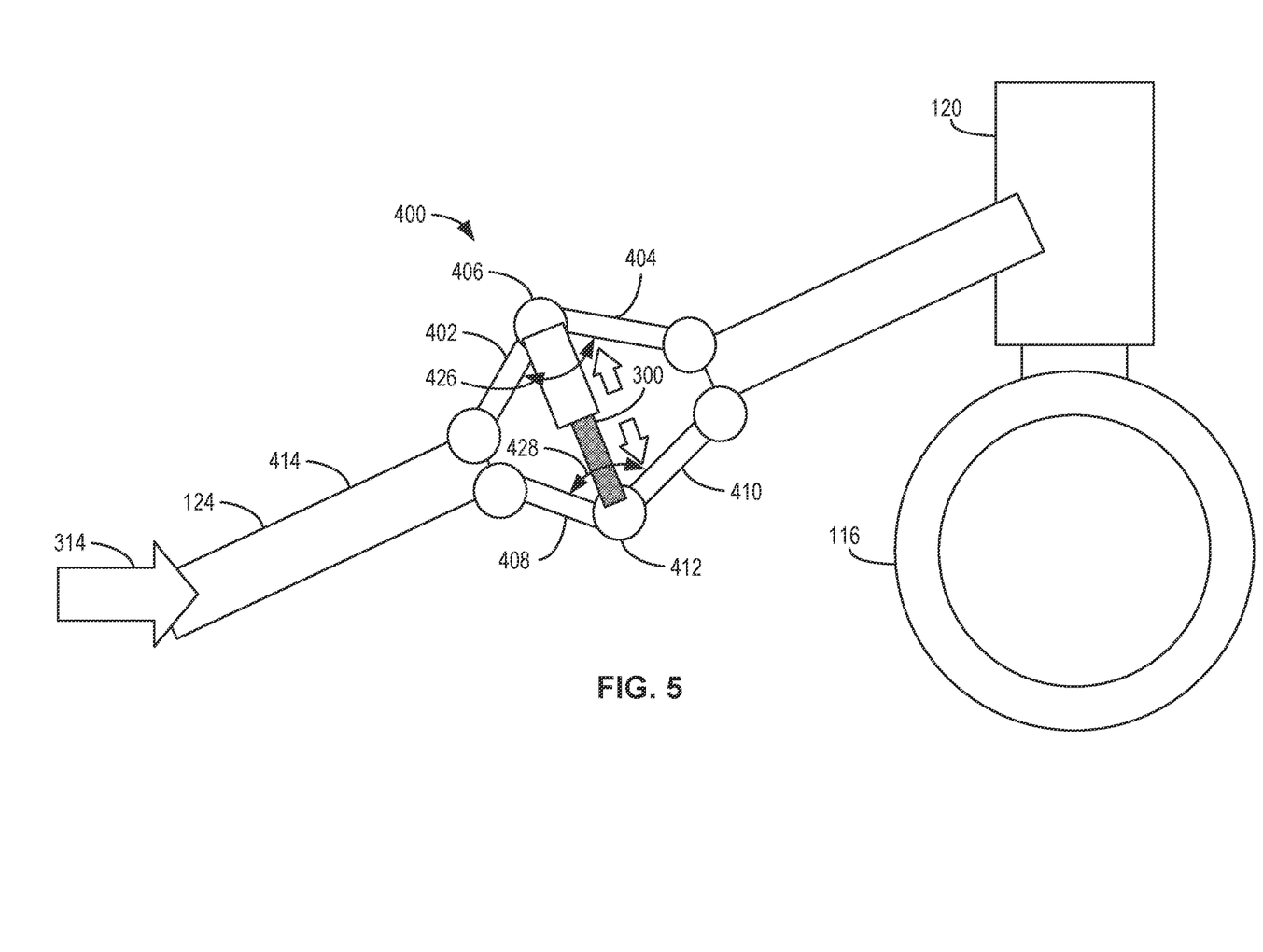
FIG. 5 illustrates the example linkage mechanism of FIG. 4 with a shock load applied to the launch bar.

FIG. 5 illustrates the example linkage mechanism 400 when the example shock load 314 is applied to the example launch bar 124. In some examples, the shock load 314 is a shock load applied to the launch bar 124 subsequent to release of the holdback bar 128 (of FIGS. 1 and/or 2) and/or subsequent to release of the launch bar 124. In the illustrated example of FIG. 5, when the shock load 314 is applied to the launch bar 124, the first portion 414 of the launch bar 124 pushes on the first and third links 402, 408, thereby causing the first link 402 to rotate counterclockwise in the view of FIG. 5 about the first joint 406 and the third link 408 to rotate clockwise in the view of FIG. 5 about the second joint 412. As a result, the first angle 426 between the first and second links 402, 404 decreases and the second angle 428 between the third and fourth links 408, 410 also decreases.

In this example, when the first and second angles 426, 428 decrease as a result of the shock load 314, the damper 300 is extended (e.g., toward the extended position of FIG. 3A). In such examples, a portion of the shock load 314 is damped and/or dissipated by the damper 300 when the damper 300 is extended, thereby reducing loads applied to the landing gear strut 120 and/or the wheel 116.

Figure 6:
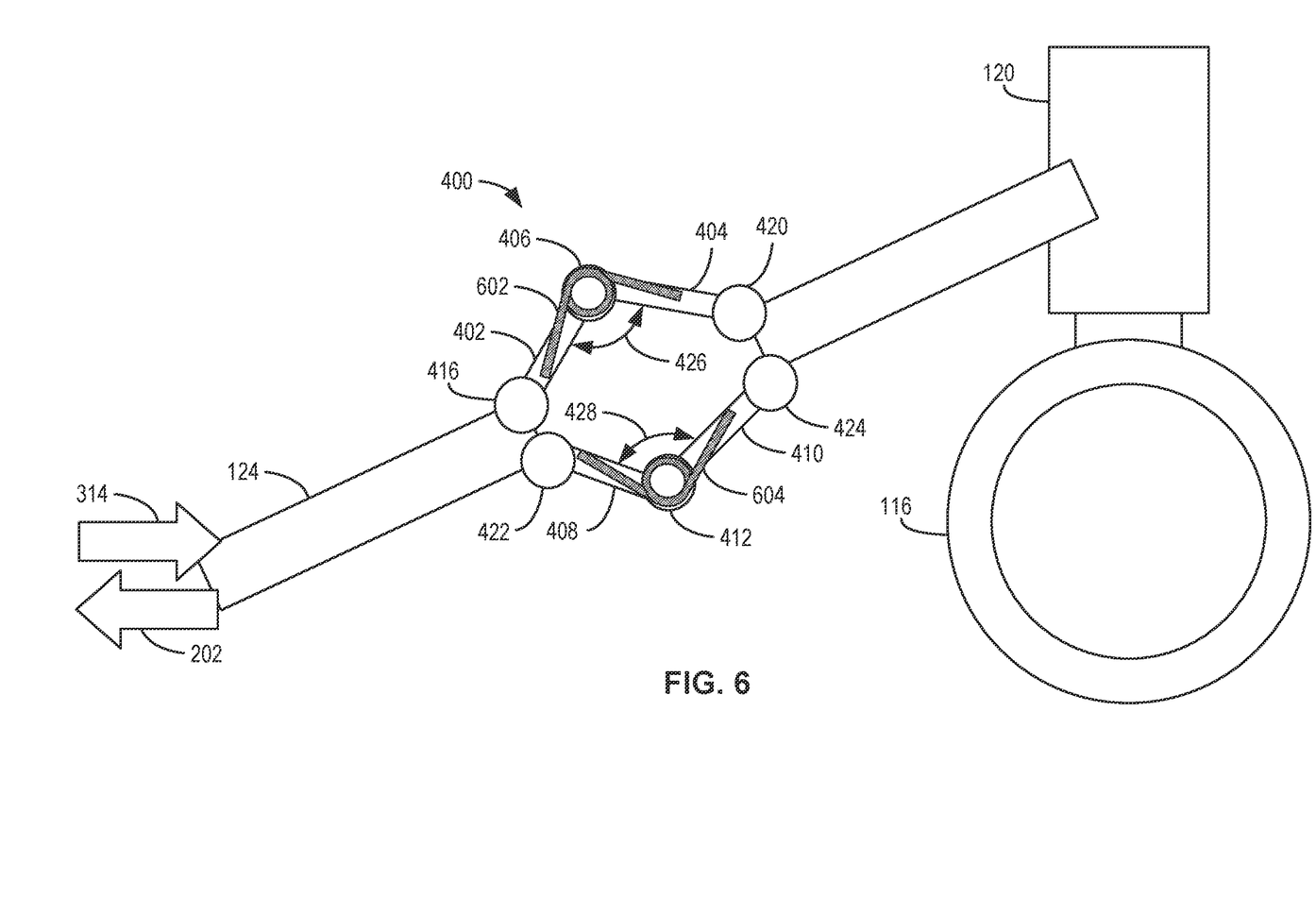
FIG. 6 illustrates the example linkage mechanism of FIGS. 4 and/or 5 with example torsion springs.

FIG. 6 illustrates the example linkage mechanism 400 of FIGS. 4 and/or 5 implementing example torsion springs 602, 604. In some examples, the torsion springs 602, 604 are used in addition to or instead of the damper 300 of FIGS. 3A, 3B, 4, and/or 5 to damp and/or reduce loads (e.g., the tensile load 202 and/or the shock load 314) applied to the launch bar 124. In the illustrated example of FIG. 6, the first torsion spring 602 is operatively coupled to the first joint 406 and the second torsion spring 604 is operatively coupled to the second joint 412. In some examples, the first torsion spring 602 opposes and/or resists rotation of the first and second links 402, 404 about the first joint 406, and the second torsion spring 604 opposes and/or resists rotation of the third and fourth links 408, 410 about the second joint 412.

For example, when the tensile load 202 causes the links 402, 404, 408, 410 to rotate about the respective joints 406, 412 (e.g., and/or otherwise causes the first and second angles 426, 428 to increase), the torsion springs 602, 604 oppose the rotation of the links 402, 404, 408, 410 to damp and/or dissipate a portion of the tensile load 202. Conversely, when the shock load 314 causes the links 402, 404, 408, 410 to rotate about the respective joints 406, 412 (e.g., and/or otherwise causes the first and second angles 426, 428 to decrease), the torsion springs 602, 604 oppose the rotation of the links 402, 404, 408, 410 to damp and/or dissipate a portion of the shock load 314. As such, the torsion springs 602, 604 can reduce the loads (e.g., the tensile load 202 and/or the shock load 314) applied to the landing gear strut 120 and/or the wheel 116.

In some examples, the linkage mechanism 400 may implement the damper 300 between the first and second joints 406, 412 along with the torsion springs 602, 604 to improve efficiency and/or effectiveness of damping the loads on the launch bar 124 (in comparison to utilizing the torsion springs 602, 604 or the damper 300 alone). While the torsion springs 602, 604 are implemented at the first and second joints 406, 412 in this example, one or more torsion springs may be implemented at the third joint 416, the fourth joint 420, the fifth joint 422, and/or the sixth joint 424 in addition to or instead of the first and second joints 406, 412.

Figure 7:
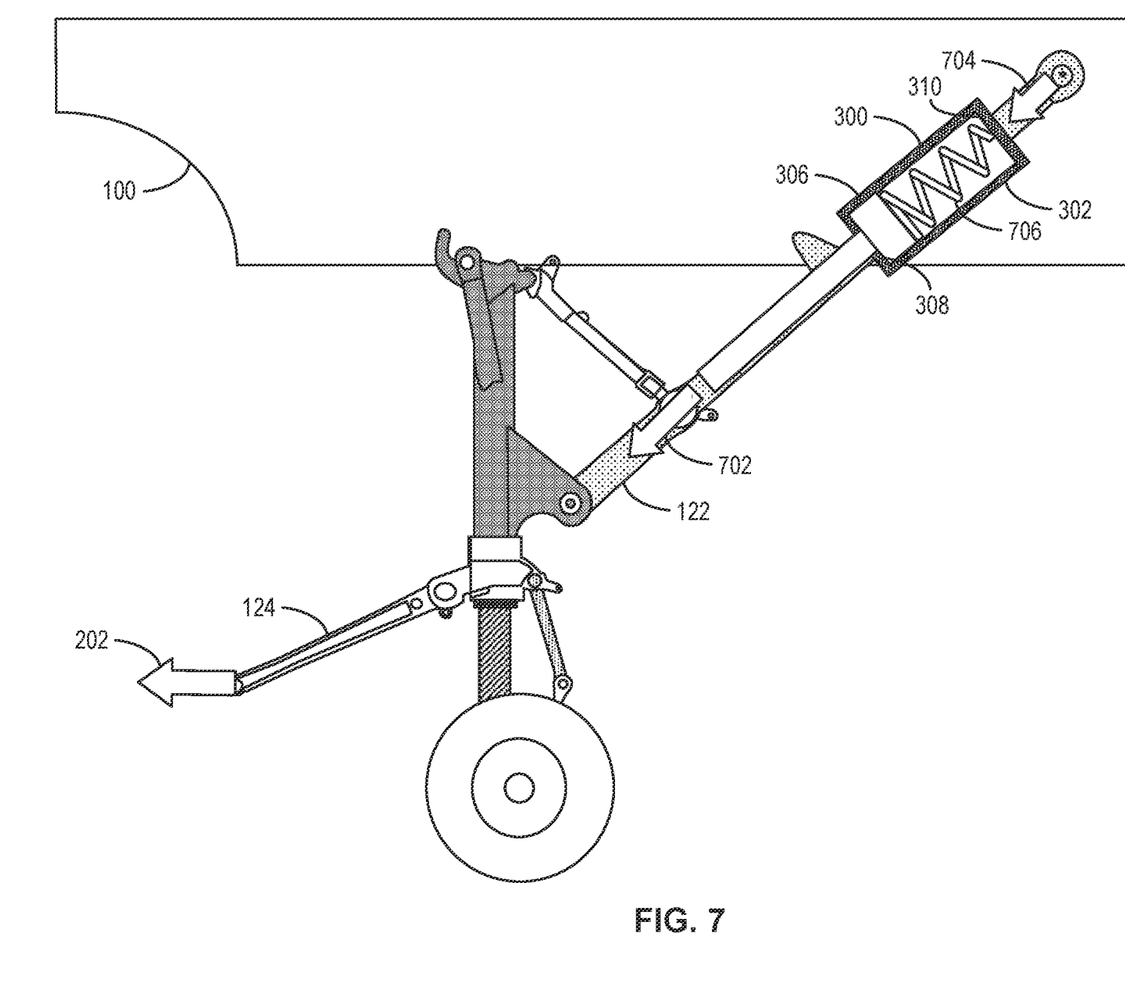
FIG. 7 illustrates an example damper of FIGS. 3A and/or 3B implemented in the example aircraft of FIG. 1.

FIG. 7 illustrates the example damper 300 of FIGS. 3A and/or 3B implemented in the example drag brace 122 of the example aircraft 100 of FIG. 1. In this example, the damper 300 is implemented in the drag brace 122 (e.g., in addition to or instead of the launch bar 124) to damp loads from the launch bar 124 to the drag brace 122 and/or the aircraft 100. In the illustrated example of FIG. 7, when the example tensile load 202 is applied to the launch bar 124, a portion of the tensile load 202 can be transferred to the drag brace 122 as a first example force 702. In some examples, the first force 702 causes the piston 306 of the damper 300 to move within the cylinder 302 to the extended position (e.g., in which the piston 306 is adjacent the first inner surface 308 of the cylinder 302). In some examples, movement of the piston 306 within the cylinder 302 damps the first force 702 such that a second example force 704 is transferred from the drag brace 122 to the aircraft 100, where a magnitude of the second force 704 is less than a magnitude of the first force 702.

In some examples, the damper 300 is biased to a resting position by an example spring 706 operatively coupled between the piston 306 and the second inner surface 310 of the cylinder 302, where the resting position in FIG. 7 corresponds to the extended position. For example, the spring 706 pushes the piston 306 toward and/or holds the piston 306 against the first inner surface 308 when little or no loads are applied on the launch bar 124. In such examples, when the tensile load 202 is applied to the launch bar 124, the piston 306 does not move within the cylinder 302 and, thus, the first reaction force 702 is not damped by the damper 300. In some such examples, the magnitude of the second force 704 corresponds to the magnitude of the first force 702.

In some examples, the damper 300 can be implemented in the launch bar 124 (e.g., as described above in connection with FIGS. 3A, 3B, 4, and/or 5) in addition to or instead of the drag brace 122. In some examples, multiple ones of the damper 300 can be implemented in the drag brace 122 and/or the launch bar 124. In some examples, the linkage mechanism 400 of FIG. 4 can be positioned in the drag brace 122, and the linkage mechanism 400 can include the damper 300 and/or the torsion springs 602, 604 of FIG. 6.

Figure 8:
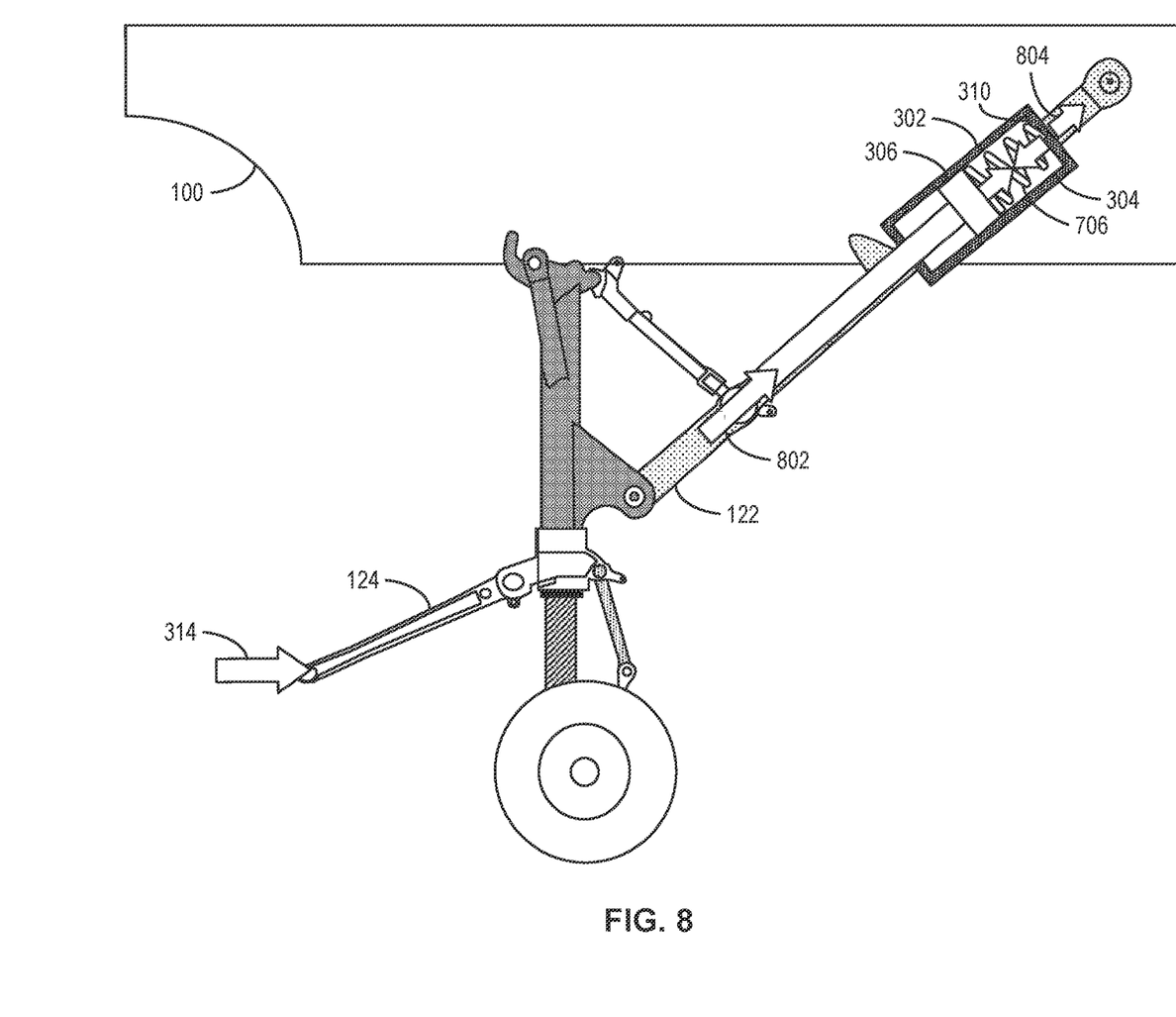
FIG. 8 illustrates the example drag brace of FIGS. 7 and/or 8 with a shock load is applied to the launch bar.

FIG. 8 illustrates the example drag brace 122 of FIG. 7 when the example shock load 314 is applied to the launch bar 124. In the illustrated example of FIG. 8, a portion of the shock load 314 can be transferred to the drag brace 122 as a third example force 802. In some examples, the third force 802 pushes the piston 306 toward the second inner surface 310 of the cylinder 302. In such examples, as the piston 306 moves toward the second inner surface 310, the piston 306 compresses the spring 706 and/or the fluid 304 in the cylinder 302. In some examples, the compression of the spring 706 and/or the cylinder 302 damps and/or dissipates the third force 802, such that a fourth example force 804 is transferred from the drag brace 122 to the aircraft 100, where a magnitude of the fourth force 804 is less than a magnitude of the third force 802. In some examples, by reducing the magnitude of the third force 802, the damper 300 reduces damage to the aircraft 100 resulting from the shock load 314.

Figure 9:
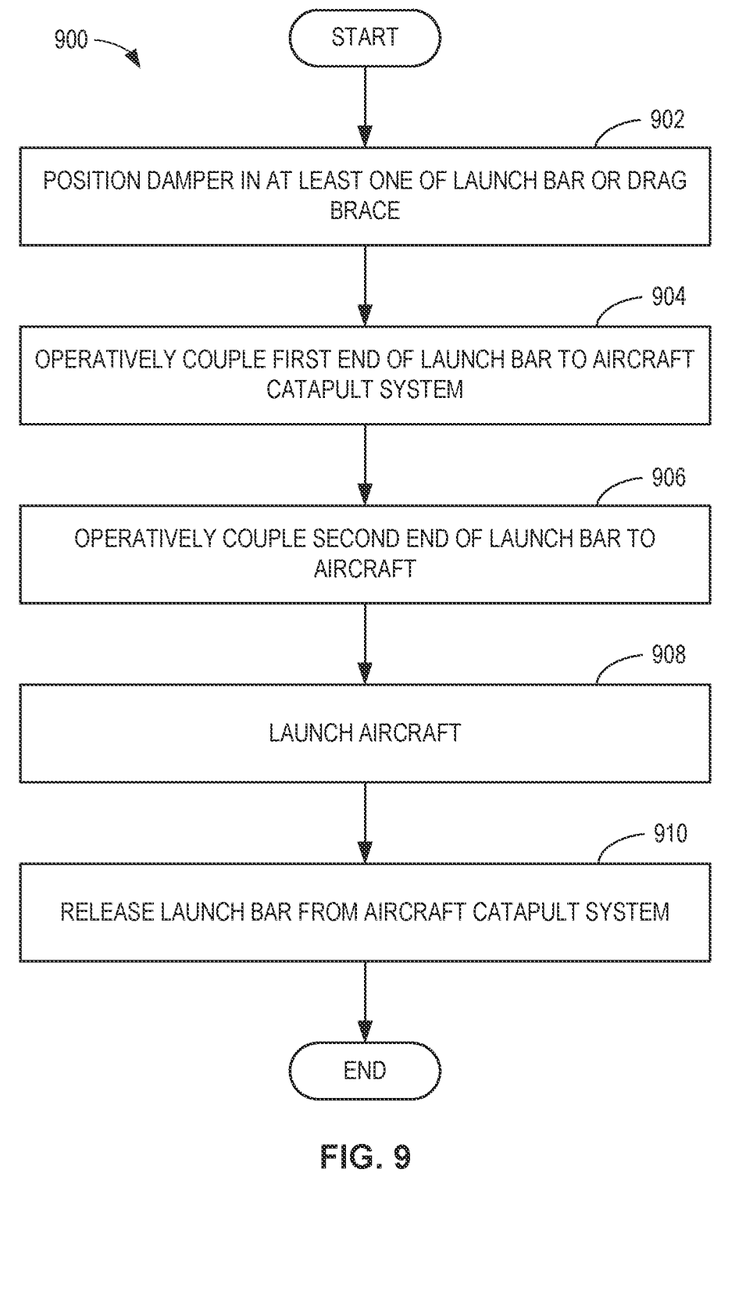
FIG. 9 is a flowchart representative of an example method to implement examples disclosed herein.

FIG. 9 is a flowchart representative of an example method 900 to implement the example damper 300 of FIGS. 3A, 3B, 4, 5, 6, 7, and/or 8. The example method 900 of FIG. 9 begins as the example aircraft 100 of FIG. 1 is positioned on the example flight deck 130 proximate the example catapult system 102 of FIG. 1.

At block 902, the example damper 300 is positioned in at least one of the example launch bar 124 or the example drag brace 122. For example, the launch bar 124 is operatively coupled between the first and second example ends 204, 205 of the launch bar 124 and oriented along the example longitudinal axis 208 of the launch bar 124. In some examples, the damper 300 is operatively coupled between the first and second example joints 406, 412 of the example linkage mechanism 400 of FIGS. 4 and/or 5, where the linkage mechanism 400 is operatively coupled between the first and second example portions 414, 418 of the launch bar 124. In some such examples, the example torsion springs 602, 604 of FIG. 6 are operatively coupled to the first and second joints 406, 412 in addition to or instead of the damper 300. In some examples, the damper 300 and/or the linkage mechanism 400 can be implemented in the drag brace 122 in addition to or instead of the launch bar 124.

At block 904, the first example end 204 of the launch bar 124 is operatively coupled to the example catapult system 102 of FIG. 1. For example, the first end 902 is releasably coupled to the example shuttle 126 of FIG. 1. In some examples, the first end 902 is movable with the shuttle 126 along the flight deck 130.

At block 906, the second example end 205 of the launch bar 124 is operatively coupled to the aircraft 100. For example, the second end 205 is coupled to the landing gear strut 120 of the nose gear 112 of the aircraft 100.

At block 908, the aircraft 100 is launched from the flight deck 130 using the catapult system 102. For example, pressurized fluid from the example accumulator 132 of FIG. 1 is used to propel the example piston 138 operatively coupled to the shuttle 126. In such examples, the shuttle 126 is accelerated along the flight deck 130, and the shuttle 126 pulls the launch bar 124 and, thus, the aircraft 100 along the flight deck 130 to launch the aircraft 100.

At block 910, the launch bar 124 is released from the catapult system 102. For example, when the aircraft 100 reaches an end of the flight deck 130 and/or reaches a threshold speed, the launch bar 124 is released from the shuttle 126 to enable takeoff of the aircraft 100 from the flight deck 130. In some examples, the damper 300 damps and/or dissipates the shock load 314 imparted on the launch bar 124 after release of the launch bar 124 from the shuttle 126.

Figure 10:
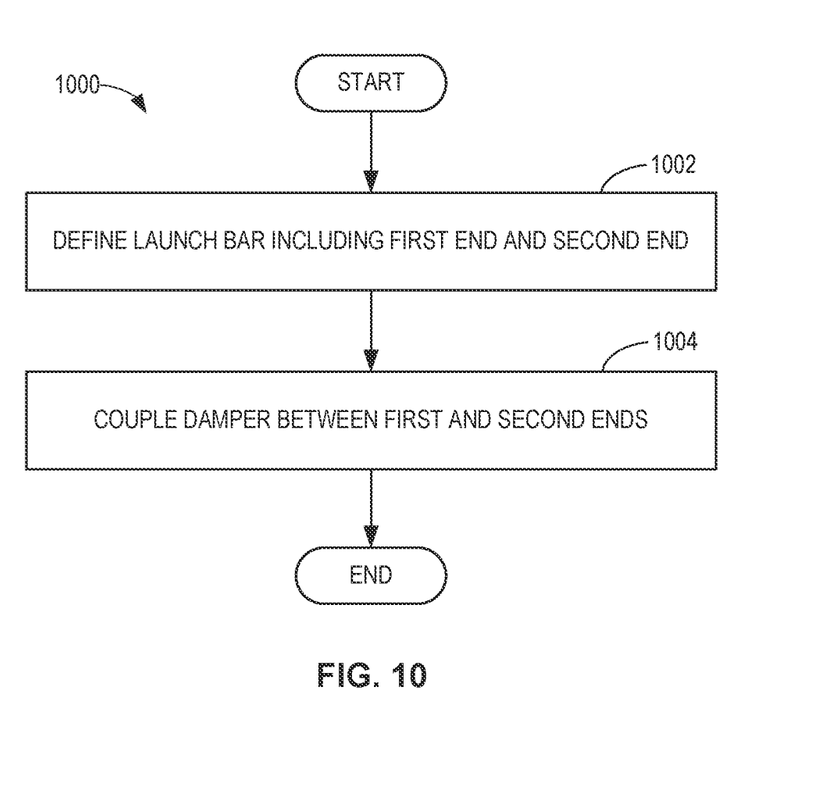
FIG. 10 is a flowchart representative of an example method to produce examples disclosed herein.

FIG. 10 is a flowchart representative of an example method 1000 to produce examples disclosed herein. The example method can be utilized to produce the example launch bar 124 implementing the example damper 300 of FIGS. 3A, 3B, 4, 5, 6, 7, and/or 8. The example method 1000 of FIG. 10 begins at block 1002, at which the example launch bar 124 is produced and/or defined (e.g., fabricated, assembled, etc.). As a result, the launch bar 124 includes the first example end 204 and the second example end 205. In some examples, the first end 204 is couplable to the example catapult system 102 of FIG. 1, and the second end 205 is couplable to the aircraft 100 of FIG. 1.

At block 1004, the example damper 300 is coupled between the first and second ends 204, 205 and the process ends. In some examples, the damper 300 is oriented along the example longitudinal axis 208 of the launch bar 124. In some examples, the damper 300 is coupled between the first and second example joints 406, 412 of the example linkage mechanism 400 of FIGS. 4 and/or 5.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

From the foregoing, it will be appreciated that example systems, methods, apparatus, and articles of manufacture have been disclosed that reduce loads applied to an aircraft during launch of the aircraft by an aircraft catapult system or other launch system. Examples disclosed herein implement a damper in at least one of a launch bar or a drag brace of the aircraft, where the damper is to damp and/or dissipate shock loads applied to the aircraft after release of the launch bar from the aircraft catapult system. In some examples, the damper includes a linear damper oriented along a longitudinal axis of the launch bar and/or the drag brace. In some examples, the damper includes the linear damper and/or one or more torsion springs operatively coupled to one or more joints of a linkage mechanism positioned in the launch bar and/or the drag brace. By damping the shock loads applied to an aircraft during launch, disclosed systems, methods, apparatus, and articles of manufacture reduce likelihood of wear of the aircraft and, thus, reduce a need for repair, service, and/or replacement of aircraft components. Further, examples disclosed herein reduce strength and/or durability requirements of the aircraft components and, as a result, enable lightweight and/or relatively inexpensive materials to be used for the aircraft components. Disclosed systems, methods, apparatus, and articles of manufacture are accordingly directed to one or more improvement(s) in the operation of a machine and/or mechanical device.

Example methods, apparatus, systems, and articles of manufacture to damp catapult loads on an aircraft are disclosed herein. Further examples and combinations thereof include the following:

Example 1 includes an apparatus comprising a launch bar including a first portion and a second portion, the first portion to be releasably coupled to an aircraft catapult, the second portion to be coupled to an aircraft, and a damper operatively coupled between the first and second portions, the damper to reduce forces applied to the launch bar at the first and second portions when the aircraft is launched by the aircraft catapult.

Example 2 includes the apparatus of example 1, wherein the damper is oriented along a longitudinal axis of the launch bar.

Example 3 includes the apparatus of example 1, wherein the damper includes a piston movable within a cylinder between an extended position and a retracted position of the damper.

Example 4 includes the apparatus of example 3, further including a spring coupled between the piston and an inner surface of the cylinder, the spring to urge the piston toward a resting position between the extended and retracted positions.

Example 5 includes the apparatus of example 1, wherein the launch bar includes a first link rotatably coupled to a second link at a first joint, and a third link rotatably coupled to a fourth link at a second joint, the forces to cause a first angular displacement between the first and second links about the first joint and cause a second angular displacement between the third and fourth links about the second joint.

Example 6 includes the apparatus of example 5, wherein the damper is to oppose the first and second angular displacements.

Example 7 includes the apparatus of example 6, wherein the damper includes a linear damper operatively coupled between the first and second joints.

Example 8 includes the apparatus of example 6, wherein the damper includes a first torsion spring operatively coupled to the first joint and a second torsion spring operatively coupled to the second joint.

Example 9 includes an apparatus comprising a towbar to be operatively coupled between a landing gear strut of an aircraft and a shuttle of an aircraft catapult system, a drag brace coupled to the landing gear strut, the drag brace at an angular offset from the landing gear strut, and a shock absorber positioned in at least one of the towbar or the drag brace, the shock absorber to dampen a longitudinal load applied to the towbar.

Example 10 includes the apparatus of example 9, wherein the shock absorber includes a piston movable within a cylinder having fluid disposed therein.

Example 11 includes the apparatus of example 9, wherein the shock absorber is substantially parallel to a longitudinal axis of the at least one of the towbar or the drag brace.

Example 12 includes the apparatus of example 9, wherein the shock absorber is spring-loaded.

Example 13 includes the apparatus of example 9, further including a linkage system positioned in the at least one of the towbar or the drag brace, the linkage system including first and second links, the first link rotatably coupled to the second link at a first joint, and third and fourth links, the third link rotatably coupled to the fourth link at a second joint, the longitudinal load to cause a first angular displacement between the first and second links about the first joint and cause a second angular displacement between the third and fourth links about the second joint.

Example 14 includes the apparatus of example 13, wherein the shock absorber is operatively coupled between the first and second joints.

Example 15 includes a method comprising defining a launch bar including a first portion and a second portion, the first portion couplable to an aircraft catapult, the second portion couplable to an aircraft, and coupling a damper between the first and second portions, the damper to reduce forces applied to the launch bar during launch of the aircraft.

Example 16 includes the method of example 15, further including orienting the damper along a longitudinal axis of the launch bar.

Example 17 includes the method of example 15, wherein the damper includes a piston movable within a cylinder between an extended position and a retracted position, and further including coupling a spring between the piston and an inner surface of the cylinder, the spring to urge the piston toward a resting position between the extended and retracted positions.

Example 18 includes the method of example 15, further including rotatably coupling a first link and a second link of the launch bar at a first joint, and rotatably coupling a third link and a fourth link of the launch bar at a second joint, the forces to cause a first angular displacement between the first and second links about the first joint and cause a second angular displacement between the third and fourth links about the second joint.

Example 19 includes the method of example 18, wherein the damper includes a linear damper, and further including coupling the linear damper between the first and second joints.

Example 20 includes the method of example 18, wherein the damper includes a first torsion spring and a second torsion spring, and further including coupling the first torsion spring to the first joint and coupling the second torsion spring to the second joint.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
    a launch bar including a first portion and a second portion, the first portion to be releasably coupled to an aircraft catapult, the second portion to be coupled to an aircraft; and
    a damper operatively coupled between the first and second portions, the damper to reduce forces applied to the launch bar at the first and second portions when the aircraft is launched by the aircraft catapult.

2. The apparatus of claim 1, wherein the damper is oriented along a longitudinal axis of the launch bar.

3. The apparatus of claim 1, wherein the damper includes a piston movable within a cylinder between an extended position and a retracted position of the damper.

4. The apparatus of claim 3, further including a spring coupled between the piston and an inner surface of the cylinder, the spring to urge the piston toward a resting position between the extended and retracted positions.

5. An apparatus comprising:
    a towbar to be operatively coupled between a landing gear strut of an aircraft and a shuttle of an aircraft catapult system;
    a drag brace coupled to the landing gear strut, the drag brace at an angular offset from the landing gear strut; and
    a shock absorber positioned in at least one of the towbar or the drag brace, the shock absorber to dampen a longitudinal load applied to the towbar.

6. The apparatus of claim 5, wherein the shock absorber includes a piston movable within a cylinder having fluid disposed therein.

7. The apparatus of claim 5, wherein the shock absorber is substantially parallel to a longitudinal axis of the at least one of the towbar or the drag brace.

8. The apparatus of claim 5, wherein the shock absorber is spring-loaded.

9. A method comprising:
    defining a launch bar including a first portion and a second portion, the first portion couplable to an aircraft catapult, the second portion couplable to an aircraft; and
    coupling a damper between the first and second portions, the damper to reduce forces applied to the launch bar during launch of the aircraft.

10. The method of claim 9, further including orienting the damper along a longitudinal axis of the launch bar.

11. The method of claim 9, wherein the damper includes a piston movable within a cylinder between an extended position and a retracted position, and further including coupling a spring between the piston and an inner surface of the cylinder, the spring to urge the piston toward a resting position between the extended and retracted positions.

* * * * *